June 21, 1955  R. H. WENDT  2,711,153
AUTOMOBILE SPEED LIMIT INDICATOR
Filed Sept. 11, 1951  2 Sheets-Sheet 1
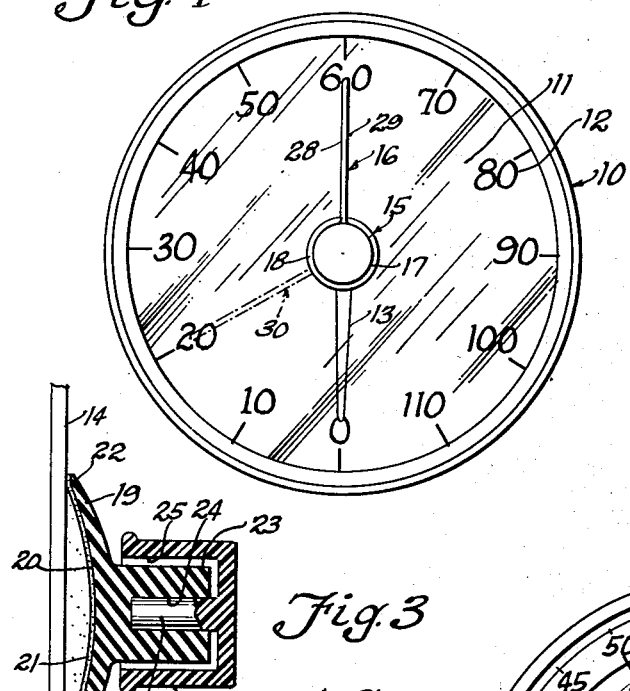
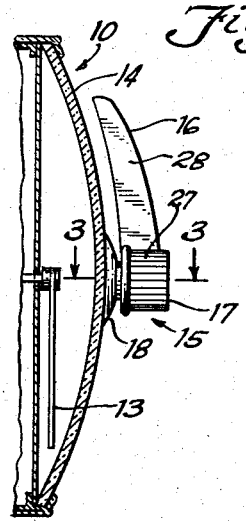
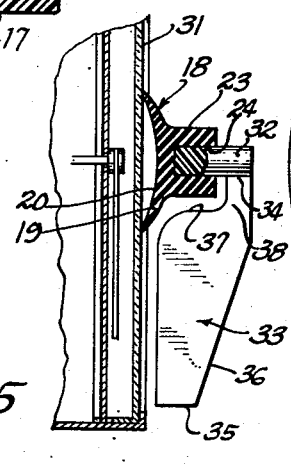
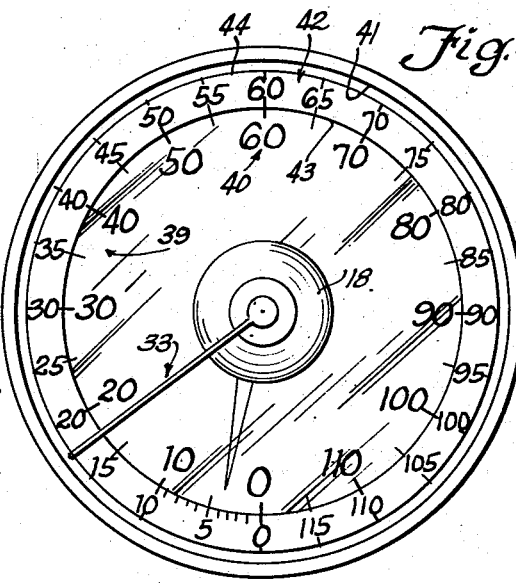
INVENTOR.
Robert H. Wendt June 21, 1955      R. H. WENDT      2,711,153
AUTOMOBILE SPEED LIMIT INDICATOR
Filed Sept. 11, 1951      2 Sheets-Sheet 2
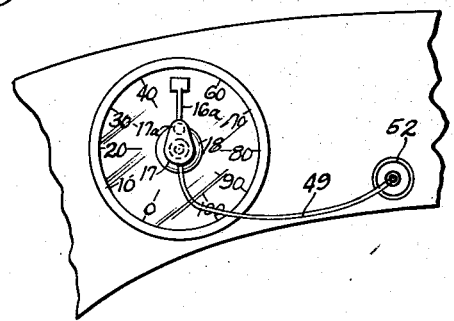
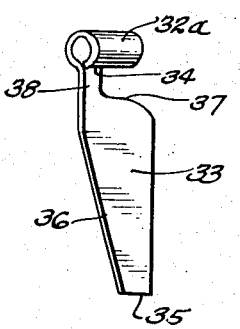
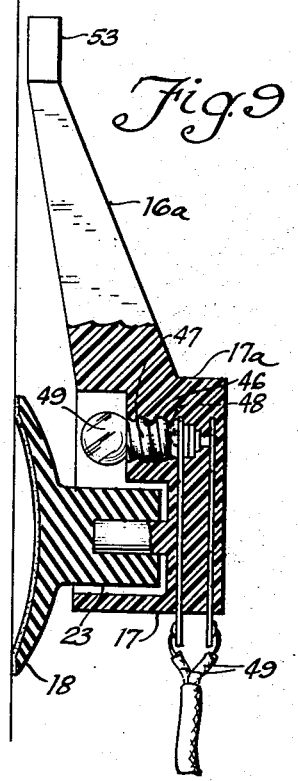
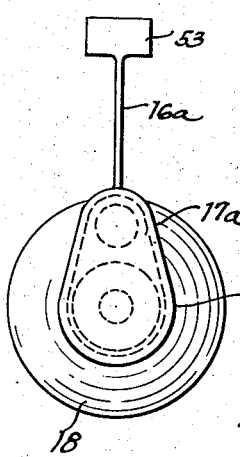
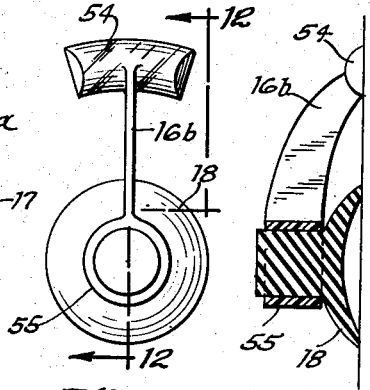
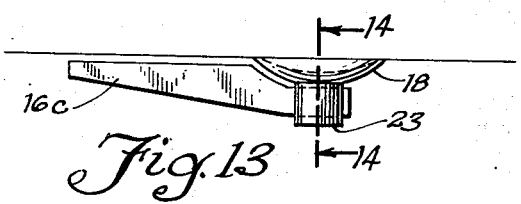
INVENTOR.
Robert H. Wendt

United States Patent Office 2,711,153
Patented June 21, 1955

2,711,153

AUTOMOBILE SPEED LIMIT INDICATOR

Robert H. Wendt, Evanston, Ill.

Application September 11, 1951, Serial No. 246,135

16 Claims. (Cl. 116—114)

The present invention relates to automobile speed limit indicators, and is particularly concerned with the provision of improved devices adapted to be used upon the speedometer of any automobile by being readily attached and adjusted at all times to indicate the proper speed limit by means of a pointer.

One of the objects of the invention is the provision of an improved adjustable speed limit indicator which is quickly attachable to the glass cover of a speedometer and adjustable in a rotative sense so that the driver or his assistant can constantly move this speed indicating pointer to the proper maximum speed limit.

Another object of the invention is the provision of a means for recording the driver's observation of speed limit signs, which recording means is adapted to be a constant reminder and used in correlation with the moving pointer of the speedometer to indicate a point beyond which the speedometer needle should not be moved.

Another object of the invention is the provision of an improved device of the class described which is useful for self-discipline in maintaining a speed below speed limits, and which may be illuminated day or night by means of connections already existing on the dash-board of most cars, and which may be constructed in any of a plurality of modifications.

Another object is the provision of an improved speed limit pointer adjustably attached to a speedometer in such manner that parallax is avoided and the true speed is more apt to be read and used as a guide in keeping below the speed limit.

Another object of the invention is the provision of an improved speed limit indicator which is adjustable on a speedometer face, and which is provided with means for indicating and magnifying the number of the speed limit which it indicates at any time.

Another object is the provision of an improved speed limit indicator which is adapted to be illuminated and which also serves to illuminate the speedometer indicia and pointer.

Another object is the provision of an improved speed limit indicator which also serves to magnify the speedometer indicia at that section of the indicia where the particular speed limit is located, serving the double purpose of reminding the user of the speed limit which he must not surpass and magnifying the numbers and pointer which he must observe.

Other objects and advantages of the invention will be apparent from the following description and the accompanying drawings, in which similar characters of reference indicate similar parts throughout the several views.

Referring to the drawings, of which there are two sheets,

Fig. 1 is a front elevational view of a speedometer equipped with a maximum speed indicator according to the invention;

Fig. 2 is a fragmentary side elevational view;

Fig. 3 is an enlarged sectional view, taken through the supporting member and the actuating knob with its shaft;

Fig. 4 is a front plan view of a speedometer assembly, including a simpler form of maximum speed indicator, which can be made out of thin sheet plastic;

Fig. 5 is a side elevational view in partial section;

Fig. 6 is a view in perspective of the maximum speed pointer alone;

Fig. 7 is a top plan view of a modified form of sheet plastic pointer;

Fig. 8 is a front elevational view of a dashboard assembly, showing an illuminated form of maximum speed indicator;

Fig. 9 is a side elevational view in partial section;

Fig. 10 is a front elevational view of another modification in which the maximum speed pointer also serves to magnify the speedometer indicia numerals and speedometer pointer position;

Fig. 11 is a front elevational view of the pointer of Fig. 12;

Fig. 12 is a side elevational view in partial section of the modification of Fig. 11;

Fig. 13 is a side elevational view of another modification;

Fig. 14 is a sectional view, taken on the plane of the line 14—14, of Fig. 13, looking in the direction of the arrows.

Referring to Figs. 1 to 3, this form of maximum speed indicator is shown in connection with a speedometer 10, having a dial 11 provided with speed indicia 12 and the usual speedometer pointer 13.

The glass cover 14 of the speedometer happens to be curved; but the present device is equally applicable to a straight and plane glass cover 14. The maximum speed indicator is indicated in its entirety by the numeral 15; and it comprises a movable pointer 16, which is preferably provided with a handle or knob 17, and is rotatably supported by a rubber suction cup unit 18.

The rubber suction cup unit 18 has a concave cup formation 19, the concavity 20 of which is pressed against the glass 14, driving the air out; and the suction cup tends to expand to the position of Fig. 3, causing it to adhere to the glass 14.

The present suction cup differs from the devices of the prior art in that it has a layer 21 of contact or pressure type adhesive so that it is no longer necessary to moisten the pressure cup; and the pressure cup will have no leakage of air and will adhere permanently to the glass 14 until it is pried loose at the edge, admitting the air.

The combination contact adhesive, resilient flexible rubber edge 22 and cup formation makes the suction cup capable of adhering to almost any surface, as distinguished from the rubber suction cups of the prior art.

The suction cup 18 has an enlarged cylindrical hub 23 with a cylindrical bore 24; and the pointer 16 has its knob 17 formed with an enlarged bore 25 surrounding the hub 23. The knob 17 also has an inwardly projecting cylindrical pin 26 located axially in the bore 25 and engaging in the cylindrical bore 24 of the suction cup hub 23.

The pin or shaft 26 distends the bore 24; and the hub 23 grips the shaft 26 resiliently and frictionally and holds the knob 17 in any position to which it may be adjusted. The knob 17 has a knurled exterior surface 27 for grip with the fingers; and the operation of the present embodiment is as follows:

The pointer 16 is preferably as narrow as possible and is preferably wide and flat, as shown in Fig. 2. It is made narrow so that it will not conceal the speedometer pointer 13, but is preferably so narrow that the speedometer pointer in some cases is visible on both sides of the maximum speed pointer 16.

By having the pointer 16 wide and flat, parallax is avoided. By parallax I mean the error which is introduced in the reading of instruments by looking at the pointer at some angle other than that which is normal or at right angles to the dial.

Since the pointer 16 is wide and flat, and since speedometers are now preferably arranged directly in front of the eyes of the driver, the driver may take care to look at the pointer 16 edgewise, which avoids the error of parallax. When the driver looks at the pointer 16 other than edgewise, he sees one or the other of the flat sides 28, 29, which indicates to him that he is not viewing the pointer at the right angle.

The suction cup 18 is preferably as small as possible so that it will occupy as little space as possible in front of the speedometer. The suction cup is located and secured on the glass 14 over the speedometer shaft, with the shaft 26 in alignment with the speedometer shaft.

When the operator observes that the speed limit is twenty miles, by observing the traffic signs, he turns the pointer 16 to the speedometer indication 20, shown in dotted lines at 30 in Fig. 1; and thereafter the driver has only to make sure that the pointer 13 does not pass the position 30.

When the speed limit is raised to 25 miles or to 30, 35, or whatever it may be, the driver should again adjust the pointer 16 by rotating the knob 17 on the hub 23; and he should at all times make sure that the speedometer pointer does not pass the setting of the maximum speed pointer. The hub 23, gripping the shaft 26, will hold the maximum speed pointer at any adjusted position. Thus, if the driver uses the present device, he will be disciplined to observe the speed signs and to make a record of his observation, and thereafter to follow his observation by not exceeding the speed limit as indicated on his speedometer.

Referring to Figs. 4 to 6, these show a simpler modification, in which the pointer itself serves as a handle; and the pointer is adapted to be struck out of sheets of plastic material and provided with a suitable shaft.

In this case a pointer 33 may be exactly similar in construction to the one previously described and is shown in connection with a straight or plane faced speedometer glass 31. The pointer is provided with a shaft 32, comprising a short rod of plastic, such as Lucite, which is integrally welded to the pointer 33 at the point 34.

The pointer 33 may comprise a wide, thin piece of sheet plastic, such as Lucite, having a straight edge at 34, a straight end 35, and a straight beveled side 36. Thus the pointer 33 is wedge shaped, except that it is cut out at 37 to make room for the hub 23 of the suction cup; and it has an attaching flange portion 38, which extends over the end of the hub and is welded to the shaft 32.

In this case the pointer is preferably made of the same radial length as the radius of the glass 31, which in most cases is much larger than the speedometer dial 39. The indicia 40 on the speedometer outlet are located inwardly of the edge 41 of the glass; and unfortunately the indicia 40 of the speedometer runs in units of ten and does not usually include the intermediate numbers ending in five.

This causes the observer to interpolate, which is to determine the dial reading between the numbers ending in zero; and it frequently happens that the speed limit is 25 or 35, or some other number, such as 45, at which there is a scale division, but no number on the speedometer dial.

I prefer to provide the glass 31 with an annular paper or fabric strip 42, the inner border 43 of which is outside of the speedometer readings, and the outer border 44 of which may be as large as possible, up to the size of the glass. This paper or fabric strip 42 has contact adhesive on its back side; and it is opaque and provided with the scale indicia and scale divisions in intervals of five.

Because this strip scale 42 is on a larger diameter, its scale divisions, corresponding to one mile, are farther apart and more easily seen; and there is room to include the numbers 5, 10, 15, 20, and so on, which are the actual numbers of speed limits; and there is no necessity for interpolation by the driver. In other words, 25 miles per hour is a frequently used speed limit; but the number does not appear on many speedometer dials. The same is true of 35 miles per hour or 45 miles per hour.

When the present auxiliary dial strip 42 is secured to the glass 31 and the suction hub 18 is axially secured to the glass, the maximum speed pointer 33 may extend all the way out to the indicia on the strip 42, thereby enabling the driver to set his maximum speed limit pointer more accurately.

It is a fact that some inexperienced drivers are unable to find the proper scale division without numbers as they appear on the strip 42.

The present assembly, in addition to the speedometer, includes only four parts, which are made of stock materials; and it may be manufactured at a very low cost and sold at such a low figure that the device is well within the means of any driver. In the present embodiment the pointer 33 serves also as a handle to be grasped by the user to turn the pointer to any desired position.

Referring to Fig. 7, this is a modification in which the shaft 32a is in the form of an integral flange on the pointer 33 rolled into a cylindrical bead so that the pointer in this type is made entirely of sheet material, which may be metal or plastic.

Referring to Figs. 8, 9, and 10, this is a modification in which the pointer is illuminated and, if desired, may serve to illuminate the scale. In this case the pointer is mounted upon the same knob 17; but the knob has an integral extension 17a, which integrally supports the flat Lucite pointer 16a.

The knob has a cylindrical socket 46, within which is secured a screw type metal socket 47 with a center contact 48 for receiving a small electric bulb 49, preferably of the six-volt size. The screw socket 47 and its center contact 48 are connected to two insulated conductors 49, which extend across the upper part of the knob 17, and are connected to a suitable plug 51 to be plugged in the cigar lighter socket 52.

The pointer 16a carries a rectangular plate 53 at its outer end; and all of the sides of the pointer and plate 53 are preferably covered with opaque reflecting material, such as aluminum foil, leaving the under sides adjacent the speedometer glass uncovered for emission of the light. Thus the present modification permits illumination of the pointer and the scale indicia of the speedometer at the speed limit for which it is adjusted.

Referring to Figs. 11 and 12, these show the pointer 16b, which may be carried by the knob of Fig. 1 or the knob of Fig. 8, provided with an arcuate, integral Lucite magnifying glass 54. This magnifying glass is preferably wide enough to extend over two scale indicia, such as from 20 to 30 miles, and magnifies not only the numbers, but the scale divisions and permits the pointer to be set in such a position that the rider can interpolate and decide where the intermediate 25 mile point is.

The magnifying glass 54 is bare on its lower side, but may have a 10 percent surface mirror coating on its upper side. With such a coating the major part of the illumination will be reflected against the scale; but the observer can look through the magnifying glass to the illuminated part of the dial.

Pointer 16b is carried by suction cup 18 by an integral curved cylindrical bearing 55 surrounding the cylindrical hub of the suction cup.

Referring to Figs. 13 and 14, these show a modification in which hub 23 of suction cup 18 has a diametrical slot for pointer 16c. Pointer 16c may be flat and triangular and cemented or vulcanized in slot 56, serving as its own handle. In this type both suction cup and pointer rotate together, whereas in the other types the pointer may rotate with or without the cup.

Pointer and cup of Fig. 13 may be one integral piece of rubber, but the pointer is preferably fluorescent plastic.

It will thus be observed that I have invented a plurality of forms of maximum speed indicators, all of which have the advantage that they are universally adaptable to existing speedometers or other meters wherever it may be desirable to record a reading or a limit.

The present speed limit indicator, when used on a speedometer, will discipline the driver and cause him to look for and observe speed limit signs and then make a temporary record of the speed limit by moving the pointer to that point on the speedometer.

It will be a useful aid to the driver to prevent him from forgetting the speed limit and to remind him that the speedometer pointer must not pass the speed limit pointer.

The present devices are adapted to render a great service to the driving public in assisting drivers in maintaining proper speed limits.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a speed limit indicator, the combination of a speedometer having a pointer, a dial provided with speed indicia and a cover, with a speed limit indicator comprising a supporting member carried by the cover, and a rotatably mounted pointer carried by said supporting member and frictionally held in any adjusted position, said pointer being rotatable to the current speed limit and constantly indicating a speed beyond which the speedometer needle should not pass, the said supporting member comprising a suction cup provided with a hub, and the said pointer being mounted on said hub, and the said pointer comprising a sheet member which is thin in a direction normal to the speedometer cover so that it will not obscure the speedometer needle entirely.

2. In an instrument limit indicator, the combination of an instrument having a pointer, a dial provided with instrument indicia and a cover, with an instrument limit indicator comprising a supporting member carried by the cover, and a rotatably mounted pointer carried by said supporting member and frictionally held in any adjusted position, said pointer being rotatable to the current instrument limit and constantly indicating a limit beyond which the instrument needle should not pass the said pointer comprising a relatively wide member in a direction normal to the instrument cover and relatively thin so that it may be used to locate the eyes in a normal position to avoid parallax.

3. In a speed limit indicator, the combination of a speedometer having a pointer, a dial provided with speed indicia and a cover, with a speed limit indicator comprising a supporting member carried by the cover, and a rotatably mounted pointer carried by said supporting member and frictionally held in any adjusted position, said pointer being rotatable to the current speed limit and constantly indicating a speed beyond which the speedometer needle should not pass, the said pointer being constructed of light conducting plastic and having an electric bulb located adjacent the supporting member and connected in the car circuit to cause the light to traverse the pointer.

4. In a speed limit indicator, the combination of a speedometer having a pointer, a dial provided with speed indicia and a cover, with a speed limit indicator comprising a supporting member carried by the cover, and a rotatably mounted pointer carried by said supporting member and frictionally held in any adjusted position, said pointer being rotatable to the current speed limit and constantly indicating a speed beyond which the speedometer needle should not pass, the said pointer being constructed of light conducting plastic and having an electric bulb located adjacent the supporting member and connected in the car circuit to cause the light to traverse the pointer, and the said pointer being covered with light reflecting foil upon its lateral sides and its edge toward the driver so that light will be emitted from the side toward the speedometer.

5. In a speed limit indicator, the combination of a speedometer having a pointer, a dial provided with speed indicia and a cover, with a speed limit indicator comprising a supporting member carried by the cover, and a rotatably mounted pointer carried by said supporting member and frictionally held in any adjusted position, said pointer being rotatable to the current speed limit and constantly indicating a speed beyond which the speedometer needle should not pass, the said pointer being constructed of light conducting plastic and having an electric bulb located adjacent the supporting member and connected in the car circuit to cause the light to traverse the pointer, and the said pointer being covered with light reflecting foil upon its lateral sides and its edge toward the driver so that light will be emitted from the side toward the speedometer, and the said pointer carrying at its end a light transmitting body for spreading the light over an area occupied by a speedometer number.

6. In a speed limit indicator, the combination of a speedometer having a pointer, a dial provided with speed indicia and a cover, with a speed limit indicator comprising a supporting member carried by the cover, and a rotatably mounted pointer carried by said supporting member and frictionally held in any adjusted position, said pointer being rotatable to the current speed limit and constantly indicating a speed beyond which the speedometer needle should not pass, the said pointer carrying at its end an arcuate plastic magnifying glass for magnifying the scale indicia of the speedometer at the point of the speed limit.

7. In a speed limit indicator, the combination of a resilient suction cup member having a hub with a pointer carried by said hub, the said suction cup being of small size to cover as little as possible of an instrument dial, and the said pointer being thin and narrow so that it will also cover a minimum part of the dial, the said pointer being provided at its outer end with an arcuate magnifying glass of plastic material for magnifying the scale indicia at which it is set.

8. A quickly attachable, detachable, and rotatable pointer assembly for instruments having a smooth cover above the dial comprising a rubber suction cup having an outwardly projecting hub provided with a bore, a thin sheet plastic pointer of fluorescent plastic of sufficient length to have its end disposed inwardly of the dial indicia of the instrument with which it is to be used, the said pointer being wide in a direction normal to the cover of the instrument and being carried by a transversely extending shaft portion of the same thickness supplemented by a pair of half cylindrical, plastic round portions secured to said transverse portion and forming a substantially cylindrical stem mounted in the bore of said suction cup, the said pointer being rotatable with the suction cup by the hand of the user applied to the suction cup, the said suction cup having its suction side provided with a layer of pressure responsive adhesive for forming an air-tight and strong bond with the cover of the instrument.

9. An indicator for instrument readings comprising a suction cup having a hub and a pointer of molded material, having a cylindrical tube rotatably mounted on said hub, said pointer extending radially and being provided with a magnifying, transparent portion at its end to be located over the instrument reading.

10. An instrument limit indicator according to claim 2, in which the supporting member comprises a resilient suction cup having a central hub rotatably mounting said pointer.

11. An instrument limit indicator according to claim 2, in which said supporting member comprises a suction rubber cup having a layer of contact adhesive, assuring the fixity of the cup on said cover.

12. An instrument limit indicator according to claim 2, in which said supporting member comprises a suction cup having a central hub provided with a transverse slot, said pointer being frictionally mounted in said slot.

13. An instrument limit indicator according to claim 2, in which said pointer comprises a flat strip of sheet material formed with an integral axially projecting tube at one end, said tube being rotatably mounted in a bore in the hub of a suction cup.

14. An instrument limit indicator according to claim 2, in which said supporting member comprises a suction cup having a central hub provided with an axial bore, said pointer having a shaft in said bore, and a cup surrounding said hub and provided with a knurled surface.

15. An instrument limit indicator according to claim 2, in which said supporting member comprises a suction cup having a central hub provided with an axial bore, said pointer having a stem rotatably mounted in said bore, and having its wide member extending inwardly toward the cover, and extending radially from said supporting member.

16. An instrument limit indicator according to claim 2 in which said supporting member has a round hub extending transversely to said pointer and said pointer has a round bearing surrounding said hub for rotation on said cover.

References Cited in the file of this patent

UNITED STATES PATENTS

| | | |
|---|---|---|
| 611,722 | Weston | Oct. 4, 1898 |
| 886,189 | Crouch | Apr. 28, 1908 |
| 1,048,159 | Hibschman | Dec. 24, 1912 |
| 2,117,441 | McWeeny | May 17, 1938 |
| 2,164,318 | Graunke | July 4, 1939 |
| 2,175,129 | Rolfson | Oct. 3, 1939 |
| 2,280,700 | Hall | Apr. 21, 1942 |
| 2,282,209 | Pepper | May 5, 1942 |
| 2,287,554 | Hanson | June 23, 1942 |
| 2,347,129 | Salit | Apr. 18, 1944 |
| 2,433,165 | Simpson | Dec. 23, 1947 |
| 2,484,038 | Kirlin | Oct. 11, 1949 |
| 2,501,033 | Denison | Mar. 21, 1950 |
| 2,538,218 | Treese | Jan. 16, 1951 |
| 2,584,777 | Adolfson | Feb. 5, 1952 |

FOREIGN PATENTS

| | | |
|---|---|---|
| 295,121 | Great Britain | Aug. 9, 1928 |
| 645,444 | France | June 27, 1928 |